United States Patent
Cheesman et al.

[11] Patent Number: 6,141,342
[45] Date of Patent: Oct. 31, 2000

[54] APPARATUS AND METHOD FOR COMPLETING INTER-SWITCH CALLS USING LARGE TRUNK GROUPS

[75] Inventors: Julian Francis Cheesman, Kanata; Michael C. Kahnert, Ottawa; Cristian Constantinof, Kanata, all of Canada

[73] Assignee: Nortel Networks Corporation, Montreal, Canada

[21] Appl. No.: 09/203,397

[22] Filed: Dec. 2, 1998

[51] Int. Cl.[7] ............................ H04L 12/28; H04L 12/56
[52] U.S. Cl. ........................ 370/352; 370/396; 370/410
[58] Field of Search .................. 370/399, 465, 370/466, 395, 396, 410, 412, 352, 353, 354, 400, 401, 524

[56] References Cited

U.S. PATENT DOCUMENTS

| | | | |
|---|---|---|---|
| 5,365,524 | 11/1994 | Hiller et al. | 370/94.2 |
| 5,483,527 | 1/1996 | Doshi et al. | 370/399 |
| 5,568,475 | 10/1996 | Doshi et al. | 370/399 |
| 5,764,644 | 6/1998 | Miska et al. | 370/465 |
| 5,883,950 | 3/1999 | Sonnenberg | 379/220 |
| 5,910,981 | 6/1999 | Bhagat et al. | 370/219 |

*Primary Examiner*—Hassan Kizou
*Assistant Examiner*—Hanh Nguyen

[57] ABSTRACT

A method and apparatus are disclosed for completing inter-switch calls using a single large trunk group connected to ATM facilities. In a first embodiment, all non-featured inter-switch calls are routed to the ATM facilities over the single large trunk groups. In a second embodiment, all inter-switch calls are routed to the ATM facilities over the single large trunk group. A call manager associated with the signaling network and the ATM facilities controls call routing. The advantage is a significant simplification in the translation and routing tables at the switches in the telephone network, resulting in significant savings related to the maintenance of a plurality of trunks groups at each switch.

18 Claims, 7 Drawing Sheets

APPARATUS AND METHOD FOR COMPLETING INTER-SWITCH CALLS USING LARGE TRUNK GROUPS

FIELD OF THE INVENTION

The present invention relates to the field of inter-switch call completion in switched telephone networks and, in particular, an apparatus and method for completing inter-switch telephone calls using large trunk groups which interface with ATM facilities.

BACKGROUND OF THE INVENTION

Bearer traffic in a switched telephone network may be characterized as intra-office traffic, inter-office traffic and inter-exchange traffic. Intra-office traffic is traffic that originates and terminates in an end office. Inter-office traffic is traffic that originates in one end office and terminates in another end office in the same exchange. Inter-office traffic may be routed directly between end offices on trunks referred to as "high usage group" trunks, or indirectly through a local tandem switch. Inter-exchange traffic is traffic that originates in an end office in one exchange, and terminates in an end office in another exchange. Inter-exchange traffic is routed through one or more tandem switches before it reaches a terminating end office.

In a conventional switched telephone network, switches are arranged heirarchically and are interconnected by trunks used to complete calls. The hierarchical structure of the network minimizes the number of trunks required to provide full connectivity in the network. Nonetheless, in order to ensure adequate capacity and routing flexibility, a large number of trunk groups must be terminated at each switch in the network. It is well known that each trunk group requires maintenance of the physical facilities, as well as maintenance of the routing and translation tables required for call routing. Consequently, whenever a new trunk or trunk group has to be provisioned between switches, the routing tables at each of the switches must be updated so that calls can be routed over these newly provisioned trunks. Conversely, if a trunk or trunk group has to be de-commissioned for maintenance, both of the switches connected to the trunk group must have their routing tables updated to prevent calls from being routed over those trunks.

In recent years, the volume of traffic in the Public Switched Telephone Network (PSTN) has increased dramatically as a result of new telephone services and the increased demand for access to Internet Service Providers (ISPs). This increase in traffic volume has necessitated an increase in the number of trunks provisioned between switches in the PSTN. Concurrently, the introduction of competition in most telephone service markets has forced service providers to examine operating costs in an effort to become more competitive. The examination of operating costs has revealed that operating costs associated with trunk provisioning and maintenance contribute significantly to operating overhead. Consequently, a need exists for a way of controlling the operating overhead associated with trunk provisioning at each of the switches in a switched telephone network.

There has been considerable recent interest in the use of asynchronous transfer mode (ATM) backbone networks for the transfer of switched telephone traffic to increase network capacity. Several different systems for accomplishing this have been invented, including Applicant's co-pending application, entitled TRANSIT TRUNK SUBNETWORK, filed Sep. 23, 1998, and assigned application Ser. No. 09/158,855. A transit trunk subnetwork has several distinct advantages over conventional inter-switch trunk facilities when utilized as described in the above-referenced patent application. For example, the ATM backbone resources in the network can be used to permit flexible routing options between originating and terminating end offices in the switched telephone network. This substantially eliminates the heirarchical structure of the switched telephone network and permits dynamic resource sharing. During low usage periods, the ATM backbone resources can be used for other purposes, such as data transfer to other networks, to further increase revenue and offset operating costs. However, in order to fully capitalize on the benefits offered by the transit trunk subnetwork, there exists a need for a mechanism that permits flexible routing, while minimizing the overhead costs associated with trunk maintenance.

SUMMARY OF THE INVENTION

It is an object of the present invention to provide an apparatus and method for completing inter-switch calls which substantially reduces the overhead costs associated with the provisioning and maintenance of trunk connections at end offices in a switched telephone network.

It is another object of the invention to provide an apparatus and method for completing inter-switch calls which simplify the routing tables required at the end offices of a switched telephone network.

It is a further object of the present invention to provide an apparatus and method for completing inter-switch calls in a switched telephone network which permits call routing and translation tables to be maintained at a single, central facility.

It is a further object of the present invention to provide an apparatus and method for completing interswitch calls in a switched telephone network which alleviates traffic congestion in the PSTN by diverting calls to an ATM subnetwork adapted to transfer bearer traffic between end offices.

Accordingly, the invention provides an apparatus for completing inter-switch calls in a switched telephone network. The apparatus comprises ATM facilities adapted to transfer bearer traffic between the switches in the network, and an interface positioned between each of the switches and the ATM facilities. A single large trunk group interconnects each of the respective switches to a respective interface. The apparatus also includes a call manager associated with the ATM facilities connected to a signaling network for carrying call control messages between the switches in the switched telephone network. The call manager is adapted to receive inter-switch call control messages from the signaling network and coordinate the establishment of connections across the ATM facilities. The inter-switch calls are routed by the switches to the single large trunk group and the call manager routes the inter-switch calls across the ATM facilities to a terminating one of the switches using information in the call control messages.

The invention also provides a method for completing inter-switch calls in a switched telephone network wherein each of the switches of the network are connected by a single large trunk group to interfaces with ATM facilities. The ATM facilities transfer bearer traffic related to the inter-switch calls across the ATM facilities located between the interfaces. This involves first determining that a call at an originating switch is an inter-switch call. If the call is an inter-switch call, a routing table at the end office specifies that the call is to be routed to the single large trunk group. A call control message is then sent from the originating switch to a call manager logically associated with the large trunk group. The call manager determines the terminating switch for the call and modifies the call control message so as to effect call set up with the terminating switch. The modified call control message is then sent to the terminating switch. The call manager also sends messages to the interfaces to establish a virtual connection across the ATM facilities to complete the call set up.

DETAILED DESCRIPTION OF THE INVENTION

The present invention provides an apparatus and method for completing inter-switch and inter-exchange telephone calls using a large trunk group that interfaces with ATM facilities.

Figure 1:
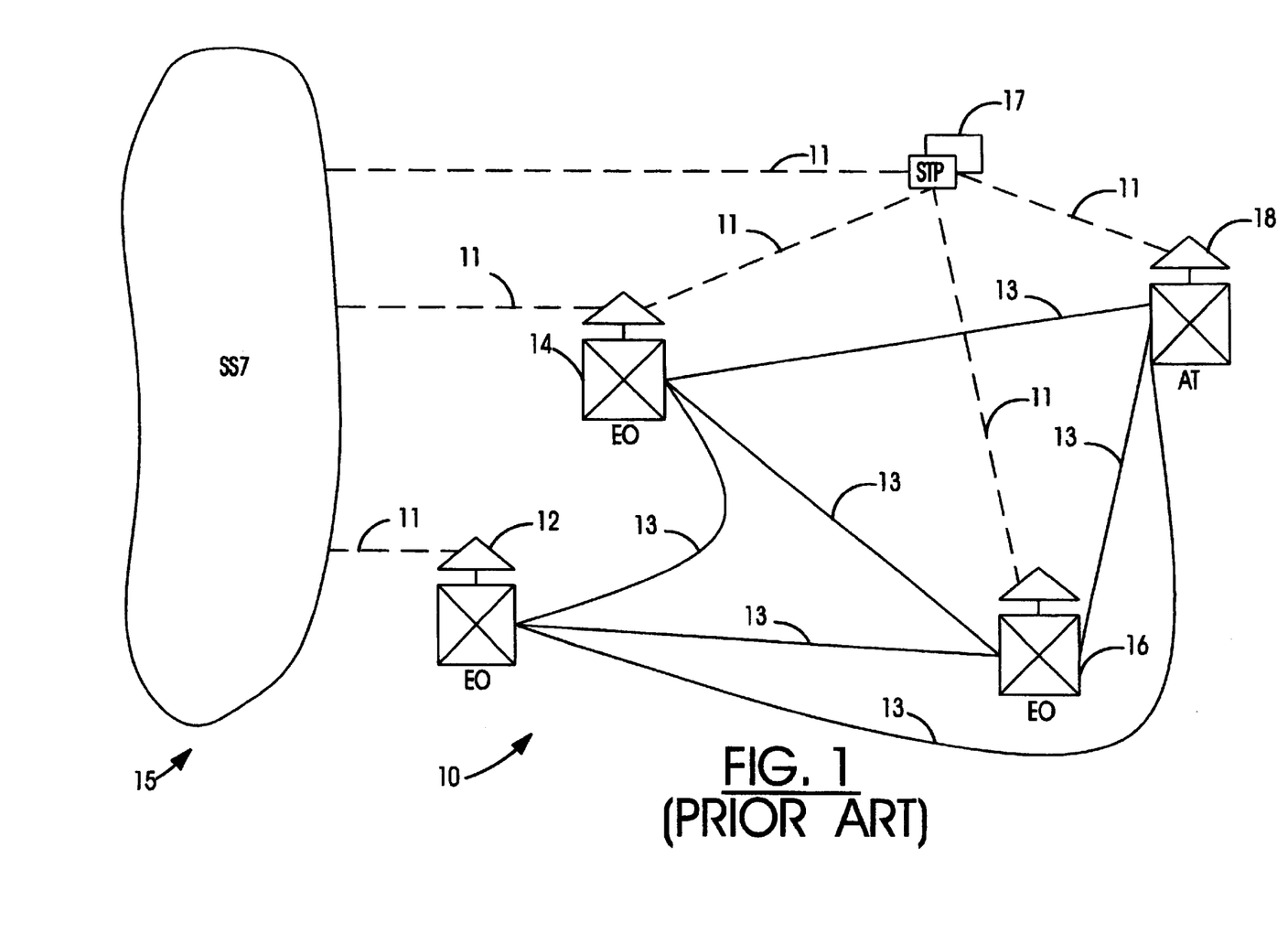
FIG. 1 illustrates a conventional switched telephone network, including end offices and an access tandem which are each in signaling communication with the SS7 network.

FIG. 1 illustrates a portion of a conventional switched telephone network 10 which includes end offices 12, 14, 16 and an access tandem 18. The end offices 12, 14, 16 and access tandem 18 are interconnected by a plurality of trunk groups 13, schematically illustrated by the solid lines shown in FIG. 1. Each end office may be provisioned with a number of trunk groups 13 which connect the end office to each of the other end offices. The access tandem 18 is provisioned with a number of trunk groups 13 connected to each of the end offices 12, 14, 16. Signaling links 11 connect each end office and access tandem to the SS7 signaling network 15 which includes signal transfer points (STPs) 17, as is well known in the art. The signaling links 11 are represented by dashed lines in FIG. 1.

In reality, a large number of trunk groups terminate at each switch in the network. Each of these trunk groups require physical maintenance, as well as maintenance of their respective call routing and translation tables. As call volume increases, more trunk groups must be provisioned to maintain an adequate capacity to handle the demand on the available resources in the switched telephone network 10. This means that the total operating overhead necessary to service and maintain each of the switches is not only large, but will continually increase as more trunk groups are added to the network to meet the demand. Therefore, a need exists for a network system which can reduce the extensive number of trunk connections made to end offices, so as to reduce the total operating cost of the network.

Figure 2:
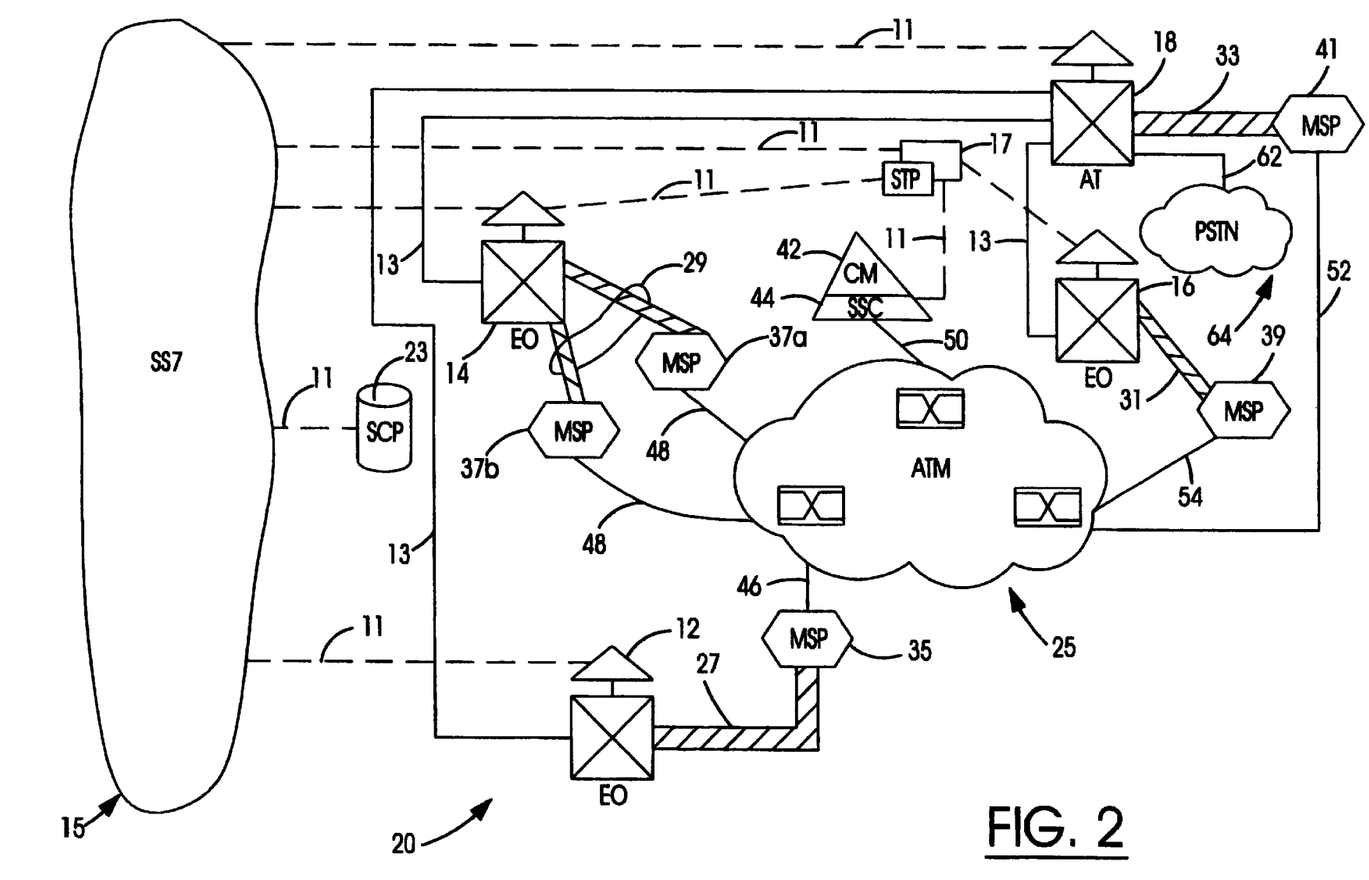
FIG. 2 illustrates a switched telephone network in accordance with the invention that includes end offices which direct non-featured traffic to respective large trunk groups connected to ATM facilities and featured traffic to trunks connected to an access tandem.

FIG. 2 illustrates a schematic diagram of a switched telephone network 20 which substantially reduces the number of trunk connections which must be provisioned at the end offices. The network 20 incorporates a transit trunk subnetwork 25, such as that described in U.S. patent application Ser. No. 09/158,855, filed by the Applicant on Sep. 23, 1998 and incorporated herein by reference. The switched telephone network 20 includes the end offices 12, 14, 16 and access tandem 18 as well as the SS7 signaling network 15. The end offices 12, 14, 16 and the access tandem 18 are configured to communicate with the SS7 signaling network 15 through signaling links 11 represented by dashed lines in FIG. 2. The SS7 signaling network also includes Signal Transfer Points (STP) 17 and a Service Control Point (SCP) 23, as is well known in the art.

The transit trunk subnetwork 25 provides ATM backbone facilities for the transfer of bearer traffic in the switched telephone network 20, and includes a plurality of interconnected ATM switches. In order to facilitate management, the transit trunk subnetwork 25 is configured to serve a limited number of telephone switches, the actual number of telephone switches served by the transit trunk subnetwork being governed principally by management choice. Adjacent transit trunk subnetworks (not illustrated) are adapted to communicate with, accept calls from and pass calls to the transit trunk subnetwork 25. The ATM facilities in the transit trunk subnetwork 25 are accessible through a plurality of interfaces 35, 37a, 37b, 39 and 41, referred to herein as multi-service platforms (MSPs). The MSPs have links 46, 48, 52 and 54 to the ATM subnetwork 25. The MSPs convert pulse code modulated (PCM) data to ATM cells, and convert ATM cells to PCM data. In addition, the MSPs set up switched virtual circuits (SVCs) across the ATM facilities to transfer bearer traffic between telephone switching offices. The implementation of a trunk transit subnetwork is advantageous, as it permits flexible call routing and diverts large portions of bearer traffic away from inter-office and inter-exchange trunks in the PSTN. As will be appreciated by those skilled in the art, the MSPs have a given capacity to complete calls which may not be adequate to support the call volume of a given telephone switch. The switches may, therefore, be provided with two or more MSPs, as shown at end office 14 which is connected to two MSPs 37a and 37b.

Each of the end offices 12, 14, 16 and access tandem 18 are connected to the respective MSPs by a single large trunk group 27, 29, 31 and 33, respectively. The trunk group 29 includes two physical trunk groups that terminate on the respective MSPs 37a, 37b, but the two physical trunk groups are logically configured on the end office 14 as a single large trunk group 29. The respective large trunk groups 27, 29, 31 and 33 are provisioned with sufficient capacity to carry a statistically predicted non-featured inter-office and inter-exchange bearer traffic load of the respective switches. The trunk groups 27, 29, 31 and 33 are terminated on the MSPs, thus it is preferable that the MSPs be located as close to the respective switches as practical. The translation and routing tables in the respective end offices are configured so that all non-featured inter-office and inter-exchange bearer traffic is routed to the single large trunk group connected to that end office. Featured inter-office and inter-exchange traffic is routed over trunk groups to the access tandem, as will be described in greater detail herein. This arrangement significantly simplifies the routing and translation tables at end offices and substantially reduces the overhead costs associated with the maintenance of those routing and translation tables. In addition, this arrangement permits the plurality of small capacity trunk groups currently required at telephone switches to be replaced by a single high capacity facility, such as an OC-3 optical link, or the like. This significantly reduces the cost of physical maintenance for trunks in the network.

The transit trunk subnetwork 25 includes a call manager (CM) 42 which is associated with a subnetwork signal controller (SSC) 44. A link 50 connects the SSC 44 to the ATM subnetwork 25. The SSC 44 receives interswitch and inter-exchange call control messages from the SS7 signaling network 15, extracts call information from these messages and passes the call information to the call manager 42. The call control messages may include any of the ISDN User Part (ISUP) messages used in the PSTN to setup and release calls. The call manager 42 uses the call information extracted from the ISUP messages to determine whether the call can be served by the transit trunk subnetwork 25. If so, the call manager 42 formulates fabric control messages and sends the fabric control messages to appropriate ones of the MSPs 35, 37a, 37b, 39 or 41, which set up switched virtual circuits across the ATM subnetwork 25 to complete the calls. Alternatively, the MSPs may use cached SVCs to complete calls as will be explained below in more detail. In addition to formulating and forwarding fabric control messages to the MSPs, the call manager 42 modifies the OPC and DPC in each ISUP message and forwards each modified ISUP message to a terminating end office to complete set up of the call.

An Operations and Management (OAM) function (not shown) provides a central facility to enable single-point maintenance of the call routing and translation tables for all switches served by the transit trunk subnetwork. In the heirarchical structure of the current PSTN, the routing and translation tables are located and maintained at each of the end offices and access tandems. The centralization of the operations and management functions further serves to reduce the costs associated with maintaining routing and translation tables. Since each end office only requires minimal routing and translation tables, maintenance of these tables is significantly reduced.

As explained above, the embodiment shown in FIG. 2 is configured to direct non-featured interswitch and inter-exchange calls to the large trunk groups 27, 29 and 31 and direct featured inter-switch and inter-exchange calls to the trunks 13, which are connected to access tandem 18. Featured calls are those which involve special services, for example, calls with 1-800, 1 888 and 1-900 prefixes. To process featured calls, a Transaction Capabilities Application Part (TCAP) query must be made to a Service Control Point (SCP) 23 in the SS7 signaling network to obtain the appropriate routing information for the call. Non-featured calls are those which do not involve special services, and do not require a TCAP query to an SCP in the SS7 signaling network.

For non-featured calls, the end offices formulate an ISUP IAM message which is addressed in accordance with its translation and routing tables. As will be apparent to those skilled in the art, the translation tables direct all such ISUP messages to the destination point code of the SSC 44, which extracts call control information from the message. The call control information is then passed to the call manager 42, which consults its translation and routing tables to determine whether the call can be terminated in the subnetwork 25. If so, it modifies the OPC and DPC of the call control message and forwards the modified message to the terminating end office. The call manager also formulates fabric control messages which are sent to the MSPs associated with the originating and terminating end offices. The fabric control messages either initiate the setup of new SVCs or the selection of an idle SVC from cache to carry the bearer traffic across the ATM network. The MSPs then map the seized trunk in the large trunk group with the SVC setup or selected to carry the call, so that the bearer traffic is transferred across the ATM subnetwork 25 between the originating and terminating end offices.

If a non-featured call cannot be terminated in the subnetwork 25, the translation and routing tables available to the call manager 42 will either: (1) direct the call to the access tandem 18 having a trunk connection 62 to the PSTN 64; or (2) direct the call across the ATM subnetwork 25 to a gateway of another ATM subnetwork (not shown) which can terminate the call, or forward the call to a subsequent subnetwork.

If the call is a featured call, the end office sends an ISUP IAM message to the access tandem 18. The access tandem is enabled with TCAP query capability necessary to obtain the routing information for completing a featured type call. Thus, the access tandem sends a TCAP query message to the SCP 23, which returns routing information to the access tandem. The access tandem then completes the call in the usual manner by directing it to the PSTN 64. The access tandem is also configured to direct calls to the ATM subnetwork 25, and can send an ISUP IAM message to the SSC 44 to initiate the routing of calls through the ATM subnetwork 25.

The network configuration of FIG. 2 provides a number of advantages over the current configuration of the PSTN besides those already described above. First, the reduction in the number of trunks provisioned at end offices permits a simplification of the translation and routing tables distributed in the end offices of the network. Second, the network configuration permits the bulk of the translation and routing tables to be maintained at a centralized operations and management interface. Third, the network configuration reduces the bearer traffic congestion in the PSTN by diverting all of the non-featured bearer traffic from TDM trunks to an ATM subnetwork. Fourth, the call manager does not need to be enabled with TCAP query functionality, since SCP queries can be performed by the access tandem 18, which is already established in the network. This permits the call manager functionality to be less complicated.

Figure 3:
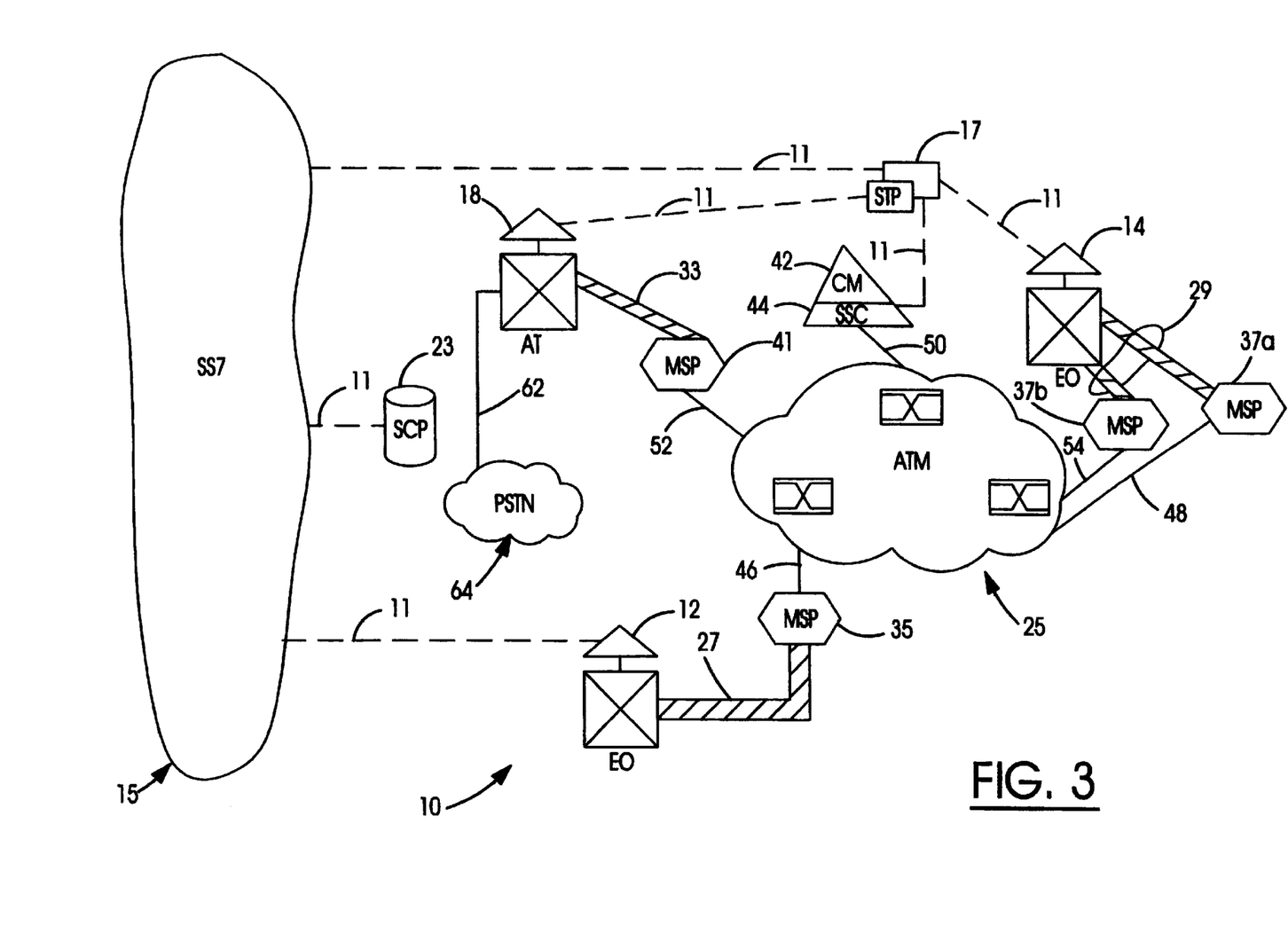
FIG. 3 illustrates a switched telephone network in accordance with the invention that includes end offices which direct all inter-office and inter-exchange bearer traffic to respective large trunk groups connected to ATM facilities.

FIG. 3 is a schematic diagram illustrating an embodiment of the invention in which both featured and non-featured calls are directed over the large trunks groups connected to the respective end offices. FIG. 3 illustrates the end offices 12 and 14 connected to the ATM subnetwork 25 through MSPs 35, 37a and 37b. The network 10 also includes an access tandem 18 connected to the ATM subnetwork through MSP 41. Each of the end offices 12, 14 and access tandem 18 are connected by signaling links 11 to the SS7 signaling network 15. The SS7 signaling network includes STPs 17 and an SCP 23, as is well known in the art. The network 10 also includes a call manager 42 connected to the ATM subnetwork 25, and associated SSC 44. The end offices 12, 14 and access tandem 18 are respectively connected to the ATM subnetwork 25 by a single large trunk group. In addition, the access tandem 18 is connected by a trunk group 62 to the PSTN 64 to permit calls that cannot be terminated otherwise to be routed to the PSTN 64.

In this embodiment, the routing and translation tables in the end offices are configured so that both featured and non-featured calls are routed over the large trunk groups to the ATM subnetwork 25. The single large trunk groups are provisioned with sufficient capacity to handle all statistically predicted inter-office and inter-exchange bearer traffic originating at a given end office. Since both featured and non-featured calls are routed through the ATM subnetwork, the call manager is enabled with TCAP query message capability so that routing information for featured calls can be obtained from the SCP 23 in the SS7 signaling network.

Call processing for non-featured calls handled by the network shown in FIG. 3 is the same as call processing for non-featured calls described above with reference to FIG. 2. However, in processing featured calls, the originating end offices 12, 14 send an ISUP IAM to the SSC 44. The SSC 44 extracts call control information from the IAM message and passes it to the call manager 42. The translation tables of the call manager direct the call manager 42 to send a TCAP query to the SCP 23 in the SS7 signaling network. When SCP 23 returns appropriate routing information to the call manager 42, the call manager uses that information to determine a route for the call. If the call can be terminated in the ATM subnetwork 25, a modified IAM (OPC=call manager point code; DPC=terminating end office point code; CIC=terminating circuit identification code) is sent to the appropriate terminating end office. The call manager then formulates and sends fabric control messages to the MSPs associated with the originating and terminating end offices to setup an SVC or select an idle SVC from cache for carrying the call. The MSPs map the SVCs to the circuit identification codes (CICs) indicated by the call manager 42 to be the channels in the trunk groups used to complete the call.

If a featured call cannot be terminated in the subnetwork 25, the translation and routing tables available to the call manager will either: (1) direct the call through the subnetwork 25 to the access tandem 18, which can route the call to the PSTN 64; or (2) direct the call to a gateway (not shown) of an adjacent ATM subnetwork, which can terminate the call or forward the call to a subsequent subnetwork.

The network configuration of FIG. 3 enables an even greater simplification of the translation and routing tables at the end offices 12, 14 than that enabled by the network configuration shown in FIG. 2. In FIG. 3, the translation and routing tables are configured to route all inter-switch and inter-exchange calls, both featured and non-featured, to the large trunk group. This simplification of routing and translation tables results in lower overhead costs for maintaining these end offices, as well as lower trunk maintenance costs since only a single large trunk group must be provisioned and maintained at the end offices.

Figure 4:
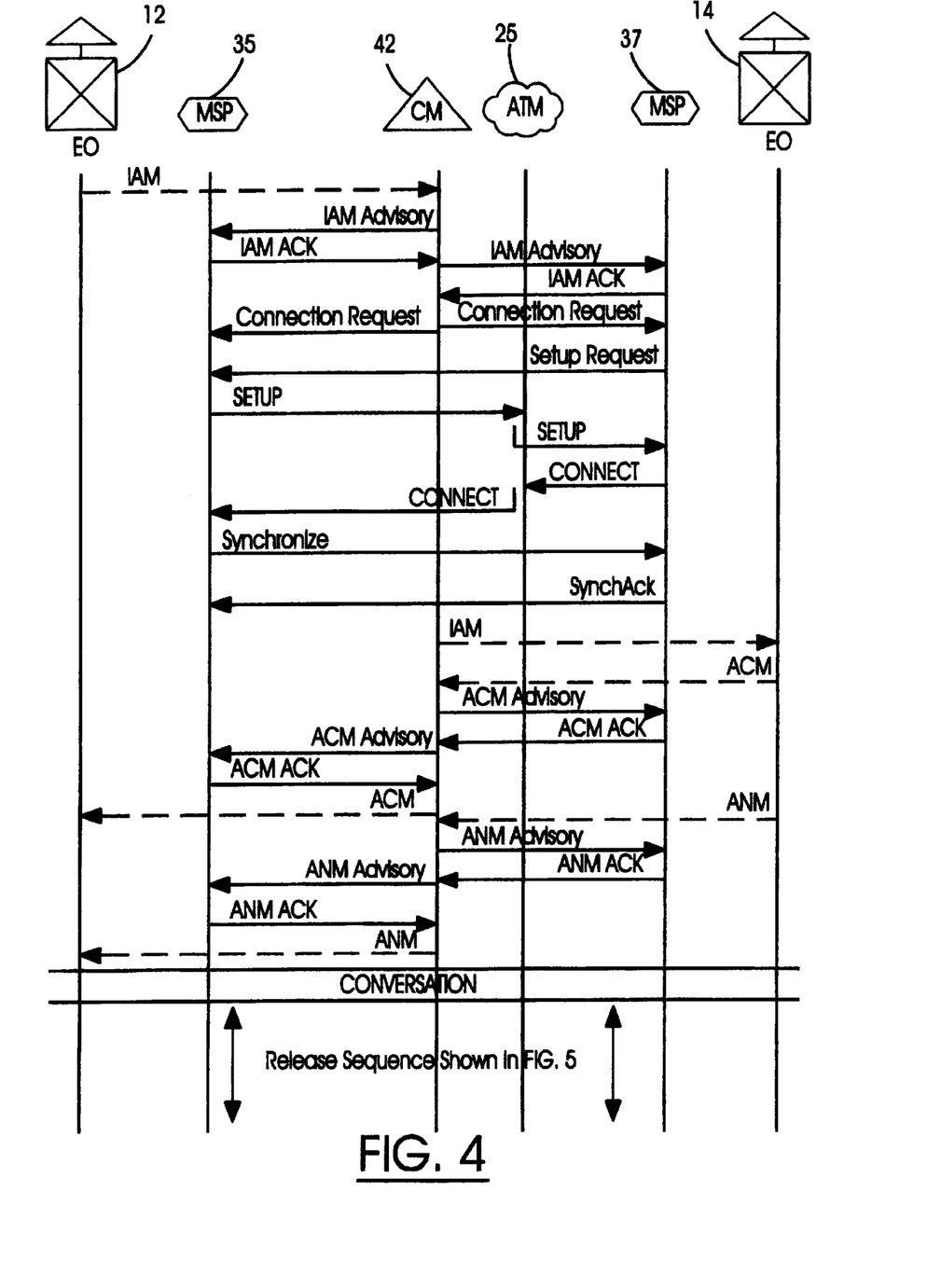
FIG. 4 illustrates a signaling sequence for setting up a non-featured inter-office call across the transit trunk subnetwork shown in FIGS. 2 and 3.

FIG. 4 illustrates the signaling sequence for connection setup of a non-featured call when a connection request originates at an end office 12. As shown in FIG. 4, an MSP 35 serves end office 12 and an MSP 37 serves end office 14. A call originates at end office 12. In response to the call, the end office 12 formulates an SS7 initial address message (IAM) and forwards the IAM over the SS7 network to the call manager 42. The SSC 44 associated with the call manager 42 extracts information from the IAM and passes the information to the call manager 42 which determines from the called number that the call should be terminated at end office 14 using terminating MSP 37. The call manager 42 uses the information extracted from the IAM to locate the interface to handle call origination, and sends an IAM advisory message to the originating MSP 35. On receipt of the IAM advisory message, the originating MSP 35 verifies the availability of resources and responds with an IAM ACK (acknowledge). The call manager 42 then sends an IAM advisory to the terminating MSP 37 which performs a verification of the availability of resources and responds with an IAM ACK. Immediately thereafter, call manager 42 sends a connection request message to the MSPs 35, 37. The connection request message may be sent exclusively to the terminating interface 37, or sent to each of the MSPs 35, 37. For reasons which will be understood by those skilled in the art, it is advantageous to effect backward call setup through the ATM network 25 if the ATM network is organized into a plurality of subnetworks, respectively managed by the call manager 42. In that case, a terminating MSP 37 has all the information required to set up backward connection through the ATM network, whereas the interface serving the originating switch does not. It should also be noted that depending on the organization of the ATM network 25, backward set up may not be required or advantageous, and is not essential to the operation of the invention. In the example shown in FIG. 4, the connection request message is sent to each of the MSPs 35, 37. The connection request message sent to the terminating MSP 37 includes:

(1) TDM path ends at MSPs 35 and 37;

(2) end point address of the originating MSP 35; and (3) other miscellaneous information.

The connection request message sent to the terminating interface 37 includes:

(1) TDM path ends at MSPs 35 and 37;

(2) endpoint address of terminating MSP 37; and (3) other miscellaneous information.

The terminating MSP 37 inserts an OAM cell-setup request in an idle or an in-use SVC and a management system at MSP 35 (not shown) sets up the new SVC. As shown in FIG. 3, the setup is accomplished by a Setup Request message sent to the ATM network from terminating MSP 37. This is followed by an ATM setup message sent from originating MSP 35 to the ATM network 25. The ATM network does the necessary routing and sends an ATM Set Up message to the terminating MSP 37. The terminating MSP 37 responds with a Connect message to the ATM network, which responds by routing an ATM connect message back to the originating MSP 35. On receipt of the ATM connect message, the originating MSP 35 sends a Synchronize message back to the terminating MSP 37. The terminating MSP responds to the Synchronize message with a Synck Ack message.

Concurrently, the call manager sends an amended IAM to the terminating end office 14. The amended IAM includes a new Destination Point Code (DPC) which is the DPC of end office 14; a new Originating Point Code (OPC), which is the OPC of the call manager 42; and a new circuit identification code (CIC), which is an available CIC in a large trunk group, as well as other information in the original IAM message. Upon receipt of the IAM, the terminating end office 14 verifies that the called party line is available. The terminating end office 14 then returns an Address Complete Message (ACM) to the call manager 42. On receipt of the ACM message, call manager 42 forwards an ACM advisory message to the respective MSPs 35, 37 and receives an ACM ACK in return. On receipt of the respective ACM ACK messages, the call manager 42 forwards the ACM over the SS7 network to the originating end office 12. When the called party answers, the end office 14 formulates an Answer Message (ANM) which it forwards over the SS7 network to the call manager 42. As with the ACM message, the call manager responds to the receipt of the ANM message by sending an ANM advisory message to each of the MSPs 35, 37 and receives an ANM ACK in return. Call manager 42 then amends the ANM message and forwards it to the end office 12. Thereafter, conversation ensues across the completed call path.

Figure 5:
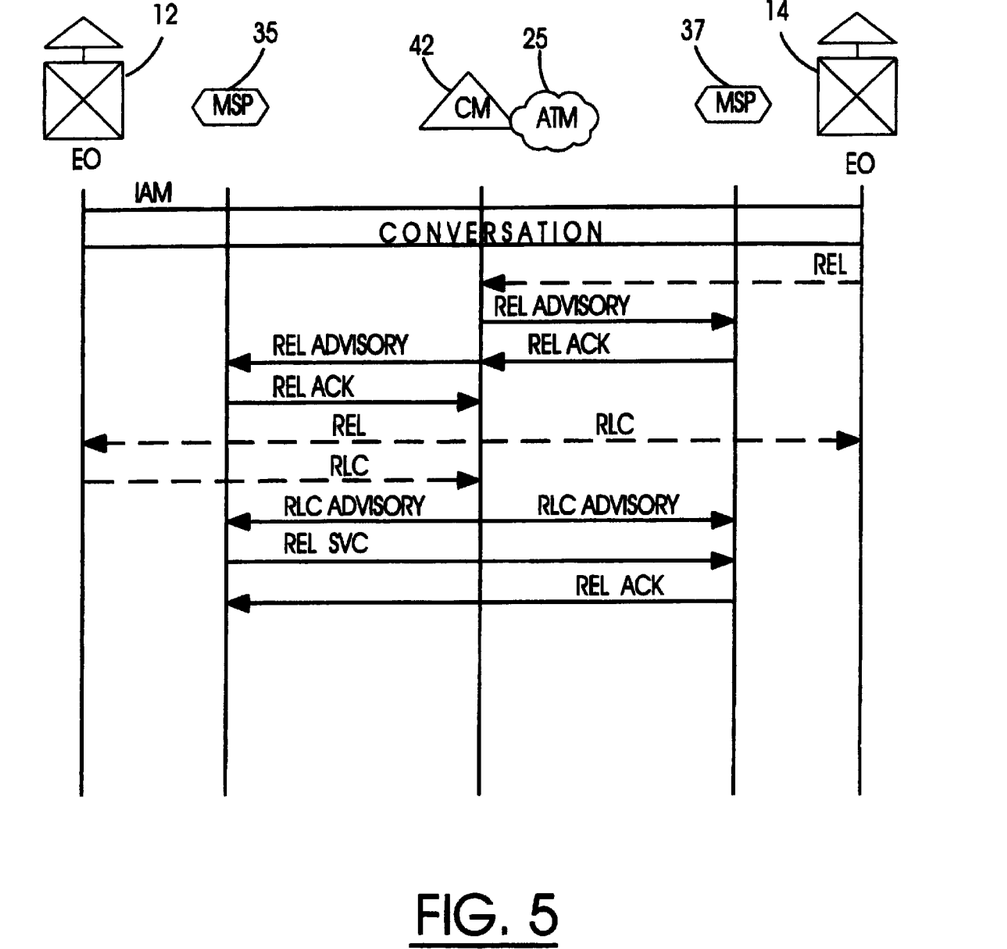
FIG. 5 illustrates a signaling sequence for releasing an inter-office call established across a transit trunk subnetwork using the procedure shown in FIG. 4.

FIG. 5 is a signaling sequence illustrating the release of a call after being set up using the signaling sequence of FIG. 4. This figure illustrates the procedure where the called party goes off-hook first. In this instance an SS7 Release (REL) message is sent from end office 14 to the call manager 42. The call manager 42 responds by sending an REL advisory message to the respective MSPs 35 and 37, and receives REL ACK messages from these MSPs in return. The call manager 42 then amends the REL message and forwards it to the end office 12. The end office 12 then returns a Release Complete (RLC) message to the call manager 42, which forwards the RLC message to the end office 14. The call manger 42 then sends RLC Advisory messages to the MSPs 35 and 37. Upon receipt of the RLC advisory messages, the MSP 35 sends a Release SVC message to MSP 37, causing the SVC utilized for the call to be released. The MSP 37 may then acknowledge the release of the SVC with a REL ACK message.

Figure 6:
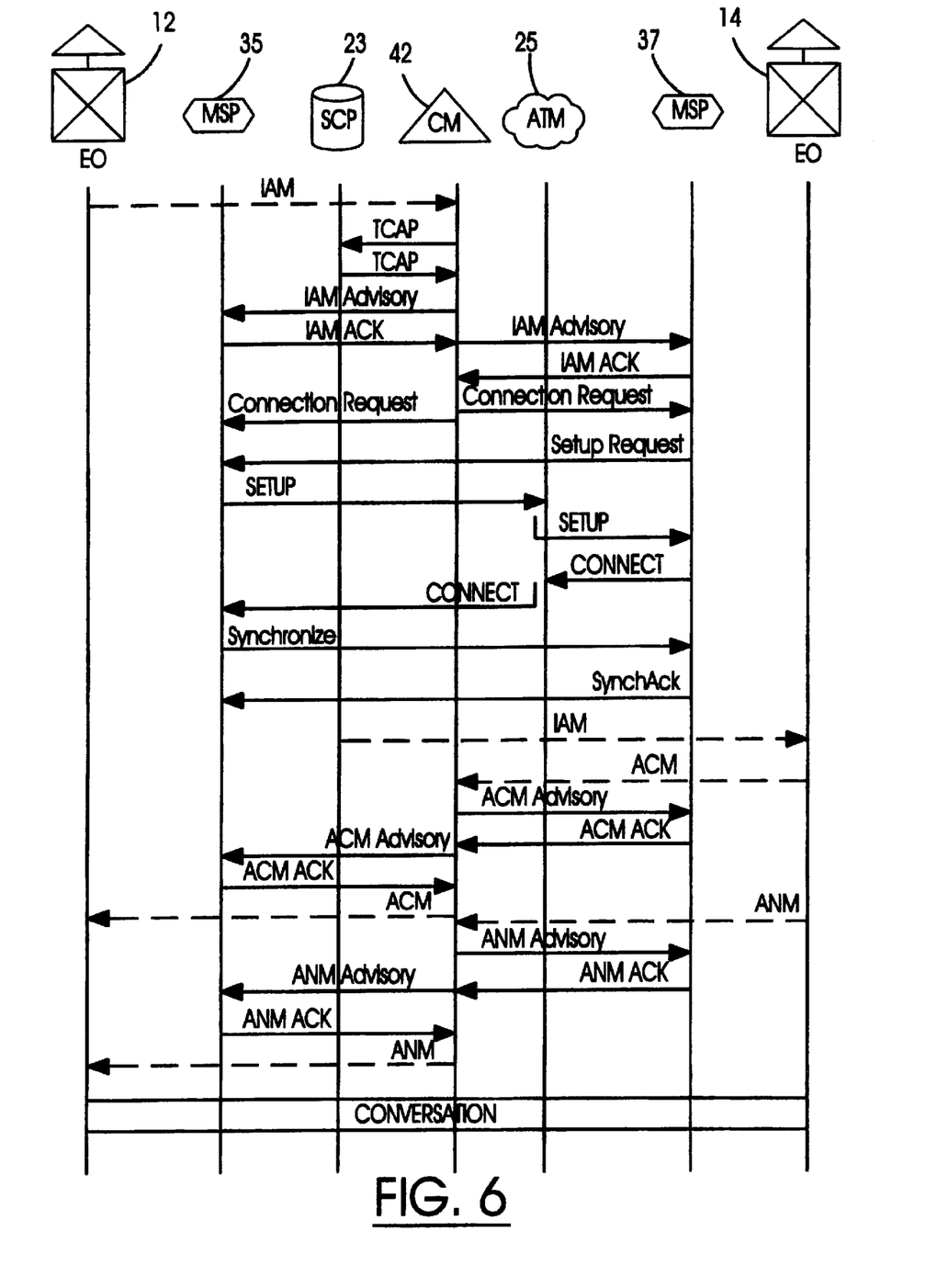
FIG. 6 illustrates a signaling sequence for setting up a featured call across the transit trunk subnetwork as shown in FIG. 3.

FIG. 6 illustrates a signaling sequence for a featured call which is routed across the ATM subnetwork 25. This figure illustrates the connection setup using SVCs when a connection request originates at an end office 12. As shown in FIG. 6, an MSP 35 serves the end office 12 and an MSP 37 serves the end office 14. A call originates at end office 12. In response to the call, the end office 12 formulates an SS7 IAM and forwards the IAM over the SS7 network to the call manager 42. The call manager 42 then formulates a TCAP query message and sends this message to the SCP 23. The SCP 23 returns a TCAP response to the call manager 42 containing routing information required to route the call to its destination. Once the TCAP response is received by the call manager, call processing proceeds as described above with reference to FIG. 4. If the featured call is terminated at the end office 14, the call is released using the procedure shown in FIG. 5.

Figure 7:
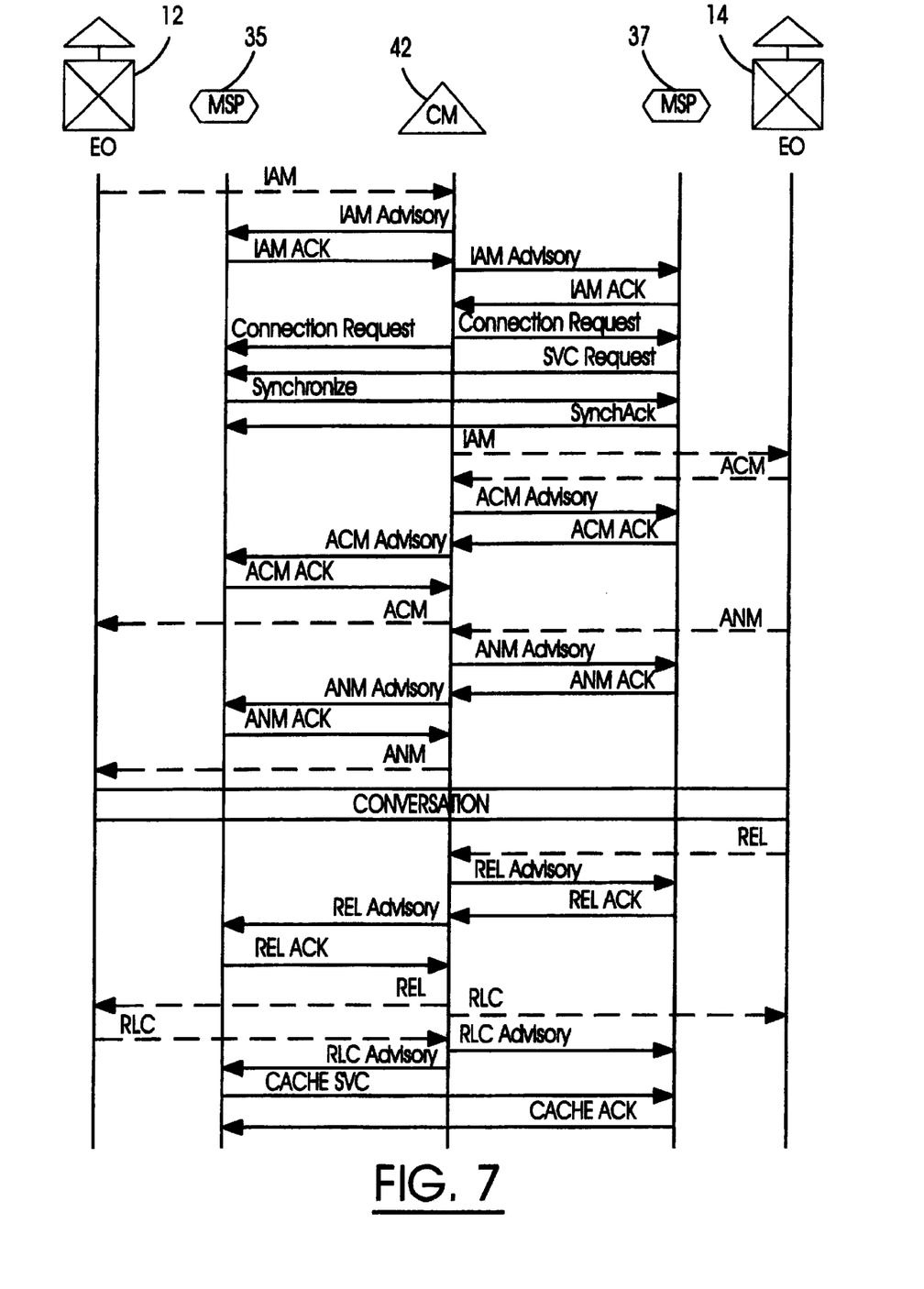
FIG. 7 illustrates a signaling sequence for setting up a call which uses an available SVC drawn from an SVC cache.

FIG. 7 illustrates a signaling sequence for the set up and release of a call when the call is transferred through the ATM subnetwork using an idle SVC drawn from an SVC cache. A detailed description of this procedure is set forth in U.S. patent application Ser. No. 09/165,189 entitled "METHOD AND APPARATUS FOR REDUCTION OF CALL SETUP RATE IN AN ATM NETWORK" filed Oct. 2, 1998 and incorporated herein by reference. This signaling sequence is substantially the same as that described above with reference to FIG. 4, except that an idle SVC is selected from cache rather than set up through the subnetwork. The selection process is initiated, in this example, by an SVC Request message sent from the terminating MSP 37 to the originating MSP 35 requesting an available SVC from cache to carry the call. MSP 35 responds to the SVC request message by selecting an idle SVC from a cache of SVCs established between the end offices 12, 14. If an idle SVC is available, MSP 35 selects it from the cache and sends a synchronize message to the terminating MSP 37 to confirm that the SVC is functional and to synchronize processes on MSP 35, 37. The MSP 37 responds to the synchronize message with a Synchronize Acknowledge (Synch Ack) message to the originating MSP 35. The call processing procedure then continues, as described above with reference to FIG. 4, to complete the call setup process. Assuming that the call is terminated at the end office 14, the call release procedure initially follows the procedure as set forth in FIG. 4 herein. However, when the call manager 42 sends Release Complete (RLC) Advisory messages to each of the MSPs 35, 37, the SVC that was used for the call may be returned to the cache, depending on a number of conditions described in detail in Applicant's co-pending patent application.

The embodiments of the invention described above are intended to be exemplary only. Changes and modifications may be apparent to those skilled in the art. The scope of the invention is therefore intended to be limited solely by the scope of the appended claims.

We claim:

1. An apparatus for completing inter-switch calls in an Asynchronous Transfer Mode (ATM) transit trunk subnetwork associated with a switched telephone network, comprising:

ATM facilities adapted to transfer bearer traffic related to the inter-switch calls between switches in the transit trunk subnetwork;

an interface positioned between each of the switches and the ATM facilities, the interfaces being adapted to convert pulse code modulated data to ATM cells and vice versa;

a single large trunk group interconnecting each of the respective switches to each of the respective interfaces, the single large trunk group being used to route all calls completed using the ATM facilities; and a call manager for the transit trunk subnetwork associated with the ATM facilities and a signaling system of the switched telephone network, the call manager being adapted to receive inter-switch call control messages from each of the switches via the signaling system and to coordinate the establishment of connections through the ATM facilities to effect the transfer of the bearer traffic between the interfaces, whereby the inter-switch calls are routed by each switch connected to the transit trunk subnetwork to the single large trunk group and the call manager routes the inter-switch calls to a terminating one of the switches using information in the call control messages and translation and routing tables for all switches in the transit trunk subnetwork.

2. The apparatus as claimed in claim 1, wherein the switches are provided with a second trunk group that connects the respective switches to an access tandem switch in the switched telephone network.

3. The apparatus as claimed in claim 2, wherein the switches route calls meeting a first criteria to the single large trunk group and calls meeting a second criteria to the second trunk group.

4. The apparatus as claimed in claim 3, wherein said first criteria is that a database query to obtain routing information for initial call routing is not required for a given call, and wherein said second criteria is that a database query to obtain routing information for initial call routing is required for a given call.

5. The apparatus as claimed in claim 1, wherein said call manager is associated with a signal controller configured to extract call information from said call control messages and direct the call information to the call manager.

6. The apparatus as claimed in claim 5, wherein said call control messages include an originating point code, (OPC) and a destination point code (DPC), and said call manager is configured to edit said OPC and DPC.

7. The apparatus as claimed in claim 6, wherein said signal controller is further configured to forward said signaling messages containing said edited OPC and DPC the terminating to one of said switches in the switched telephone network or to an adjacent subnetwork.

8. The apparatus as claimed in claim 1, wherein said call manager is enabled to query a service control point (SCP) for call routing information.

9. The apparatus as claimed in claim 8, wherein said call manager is configured to have routing control over all calls originated or terminated within said switched telephone network.

10. The apparatus as claimed in claim 1, wherein said call manager is configured to communicate with a second call manager associated with a second subnetwork.

11. The apparatus as claimed in claim 1, wherein certain ones of the switches are provided with more than one interface with the ATM facilities, each interface with the ATM facilities being connected to a corresponding switch by a trunk group.

12. The apparatus as claimed in claim 11, wherein trunk groups connected to a switch are logically configured on the switch as a single large trunk group.

13. A method of completing inter-switch calls in a switched telephone network wherein swatches in the network are respectively connected by a single large trunk group to interfaces with ATM facilities in a transit trunk subnetwork for transferring bearer traffic related to the inter-switch calls between the interfaces in the transit trunk subnetwork, the method comprising the steps of:

determining at an originating switch that a call is an inter-switch call, and routing the inter-switch call to the single large trunk group;

sending a call control message from the originating switch to a call manager for the transit trunk subnetwork;

receiving the call control message at the call manager and determining a terminating switch for the inter-switch call using information in the call control message and translation and routing tables;

modifying the call control message at the call manger and forwarding the call control message to the terminating switch to effect call set-up at the terminating switch; and sending messages from the call manager to interfaces associated with the originating and the terminating switches to provide a path across the ATM facilities to complete call set-up.

14. The method as claimed in claim 13, wherein the step of determining that a call is an inter-switch call comprises:

comparing dialed digits of a call to a call routing table configured to route all inter-switch calls to said single large trunk group.

15. The method as claimed in claim 13, wherein said step of sending a call control message comprises:

sending said call control message containing an originating point code (OPC) and destination point code (DPC) over an SS7 signaling network having connections to said originating switch and said call manager.

16. The method as claimed in claim 15, wherein said step of modifying the call control message comprises:

editing said OPC and DPC of the call control message at the call manager to produce an edited call control message and forwarding the edited call control message to the terminating switch.

17. The method as claimed in claim 13, wherein each of said switches in said switched telephone network include a second trunk group that connects the respective switches to an access tandem, wherein said step of routing an inter-switch call comprises:

routing calls that meet a first criteria to the single large trunk group and routing calls that meet a second criteria to the second trunk group.

18. The method as claimed in claim 17, wherein said first criteria is that a given call is a non-featured call and wherein said second criteria is that the given call is a featured call that requires a database query to obtain routing information for initial call routing.

* * * * *